United States Patent
Ieda et al.

(10) Patent No.: US 10,351,685 B2
(45) Date of Patent: Jul. 16, 2019

(54) WATER-SOLUBLE PACKAGING FILM

(71) Applicant: SEKISUI CHEMICAL CO., LTD., Osaka (JP)

(72) Inventors: Yasuyuki Ieda, Aichi (JP); Shintaro Moriguchi, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/509,587

(22) PCT Filed: Aug. 27, 2015

(86) PCT No.: PCT/JP2015/074217
§ 371 (c)(1),
(2) Date: Mar. 8, 2017

(87) PCT Pub. No.: WO2016/043009
PCT Pub. Date: Mar. 24, 2016

(65) Prior Publication Data
US 2017/0253708 A1 Sep. 7, 2017

(30) Foreign Application Priority Data

Sep. 17, 2014 (JP) ................... 2014-189014
Feb. 20, 2015 (JP) ................... 2015-032186
Feb. 24, 2015 (JP) ................... 2015-034360

(51) Int. Cl.
C09D 103/02 (2006.01)
C08J 7/04 (2006.01)
B32B 27/30 (2006.01)
B65D 65/40 (2006.01)
B65D 65/46 (2006.01)

(52) U.S. Cl.
CPC ............... C08J 7/042 (2013.01); B32B 27/30 (2013.01); B65D 65/40 (2013.01); B65D 65/46 (2013.01); C08J 7/04 (2013.01); C09D 103/02 (2013.01); C08J 2329/04 (2013.01); C08J 2403/02 (2013.01)

(58) Field of Classification Search
None
See application file for complete search history.

(56) References Cited

U.S. PATENT DOCUMENTS

2002/0182348 A1 12/2002 Fujiwara et al.
2009/0291282 A1* 11/2009 Kitamura .......... C08J 5/18
428/220

FOREIGN PATENT DOCUMENTS

| CN | 101679651 | 3/2010 |
|---|---|---|
| CN | 103403109 | 11/2013 |
| JP | 51-134766 | 11/1976 |
| JP | 51-138771 | 11/1976 |
| JP | 51-138772 | 11/1976 |
| JP | 51-139868 | 12/1976 |
| JP | 7-501351 | 2/1995 |
| JP | 2001-106854 | 4/2001 |
| JP | 2003-171521 | 6/2003 |
| JP | 2005-179390 | 7/2005 |
| JP | 2012-007283 | 1/2012 |
| JP | 2014-077121 | 5/2014 |
| TW | 201142109 | 12/2011 |
| TW | 201420344 | 6/2014 |
| WO | 93/04112 | 3/1993 |
| WO | 01/23460 | 4/2001 |
| WO | 02/26896 | 4/2002 |
| WO | 03/045813 | 6/2003 |
| WO | 2008/142835 | 11/2008 |
| WO | 2013/158364 | 10/2013 |

OTHER PUBLICATIONS

Kuraray Poval, Kuraray K-Polymer, 2004.*
Extended European Search Report dated Feb. 23, 2018 in European Application No. 15842220.4.
International Search Report dated Dec. 1, 2015 in corresponding International (PCT) Application No. PCT/JP2015/074217.

* cited by examiner

*Primary Examiner* — Callie E Shosho
*Assistant Examiner* — Krupa Shukla
(74) *Attorney, Agent, or Firm* — Wenderoth, Lind & Ponack, L.L.P.

(57) ABSTRACT

The present invention provides a water-soluble packaging film which is capable of inhibiting roll contamination, which has favorable unwinding properties to pass through processing steps smoothly, thereby improving the productivity, and which has enhanced water solubility, chemical resistance, visibility, and packaging properties. The present invention relates to a water-soluble packaging film including: polyvinyl alcohol; a plasticizer; and starch, the starch being applied to a front surface and a rear surface of the water-soluble packaging film, the starch being applied in an amount of 0.001 to 0.10 g per 1 $m^2$ of the water-soluble packaging film, the water-soluble packaging film having a contact angle with distilled water measured by the sessile-drop method of 20° to 50°.

16 Claims, No Drawings

WATER-SOLUBLE PACKAGING FILM

TECHNICAL FIELD

The present invention relates to a water-soluble packaging film which is capable of inhibiting roll contamination, which has favorable unwinding properties to pass through processing steps smoothly, thereby improving the productivity, and which has enhanced water solubility, chemical resistance, visibility, and packaging properties.

BACKGROUND ART

Polyvinyl alcohol (hereafter, also referred to as PVA) has been widely used as a packaging material because it is excellent in transparency, oil resistance, chemical resistance, and gas barrier properties against oxygen or the like. PVA has been often used as a packaging material for food, pharmaceuticals, industrial chemicals, agrochemicals, and the like whose properties are greatly affected by deterioration due to oxidation.

In addition, PVA has been also used as a film or sheet for temporary protection of products and parts because of its high water solubility. PVA used as a film for temporary protection, such as surface protection during metalworking, protection during vulcanization of rubber parts, and surface protection of resin molded articles, can be easily removed by water, warm water, or hot water. This enables omission of a step of peeling and discarding the protective films.

However, the water solubility of PVA is problematically lowered when PVA is subjected to a heat history during the surface protection. For example, in metalworking, the protective film may be subjected to a heat history in the step of heat pressing or the like. In such a case, PVA may not be sufficiently removed due to the lowered water solubility.

Upon use of a PVA film for packaging chemicals or the like, for example, the film wraps chemicals first and is formed into a bag, during which the film is unwound and fed continuously.

However, PVA disadvantageously has high hygroscopicity to have insufficient elasticity when formed into a film, namely, a PVA film has low stiffness. A PVA film therefore has poor surface slipperiness, resulting in poor unwinding properties of the film. As a result, there may be failures such as a shift of pitches or wrinkles of the film upon heat-sealing in a bag making machine. In other words, such a PVA film disadvantageously has low process passing properties.

To overcome the situation, Patent Literature 1 discloses a technique of adding 20 to 40 parts by weight of a plasticizer and 10 to 35 parts by weight of starch to 100 parts by weight of polyvinyl alcohol to inhibit reduction of water solubility and improve heat sealing properties and process passing properties.

However, even with the technique disclosed in Patent Literature 1, the stiffness of the film is still insufficient, resulting in poor unwinding properties. Moreover, simply adding starch to a water-soluble film may fail to give an effect of improving unwinding properties, failing to improve the process passing properties. In addition, in the technique disclosed in Patent Literature 1, a large amount of starch needs to be added. However, in a case where a large amount of starch is applied to the surface of a water-soluble film, a lot of starch is deposited on a surface of a conveying roll upon packaging of chemicals such as agrochemicals or detergents, which requires an additional step of cleaning the conveying roll, resulting in lower productivity.

Patent Literature 1 also discloses a technique of embossing the surface of a water-soluble film for the purpose of improving anti-blocking properties and process passing properties of the water-soluble film.

The embossing treatment however lowers transparency of the water-soluble film to reduce the visibility for determining if chemicals such as agrochemicals or detergents are contained therein.

Patent Literature 2 discloses a technique of improving the water solubility after a heat history by adding a hydrazine compound and a polybasic acid or an alkali metal salt thereof to a polyvinyl alcohol resin.

However, according to the technique of Patent Literature 2, the film disadvantageously exhibits poor processability upon packaging contents due to its low flexibility and has insufficient water solubility, especially resulting in a long dissolution time thereof.

A water-soluble packaging film is often formed into a bag first and then sealed with heat or the like. In such a case, the sealed portion tends to have lower durability, which leads to a defect in the sealed portion by an influence of the environment or the like after a lapse of a long period of time from inclusion of the contents, so that the film cannot wrap the contents stably over a long period of time.

To overcome the situation, Patent Literature 3 discloses a water-soluble film prepared by adding a plasticizer and sulfite to a polyvinyl alcohol resin. Such a film suffers less coloring upon film formation or less coloring with time due to contact with chemicals.

However, addition of sulfite to a water-soluble film cannot shorten the dissolution time. In addition, sulfite may react with a weak acid to generate sulfur dioxide gas, which causes offensive odors from the water-soluble film.

CITATION LIST

Patent Literature

Patent Literature 1: JP 2001-106854 A
Patent Literature 2: JP 2003-171521 A
Patent Literature 3: JP 2005-179390 A

SUMMARY OF INVENTION

Technical Problem

The present invention aims to provide a water-soluble packaging film which is capable of inhibiting roll contamination, which has favorable unwinding properties to pass through processing steps smoothly, thereby improving the productivity, and which has enhanced water solubility, chemical resistance, visibility, and packaging properties.

Solution to Problem

The present invention relates to a water-soluble packaging film including: polyvinyl alcohol; a plasticizer; and starch, the starch being applied to a front surface and a rear surface of the water-soluble packaging film, the starch being applied in an amount of 0.001 to 0.10 g per 1 $m^2$ of the water-soluble packaging film, the water-soluble packaging film having a contact angle with distilled water measured by the sessile-drop method of 20° to 50°.

The present invention is specifically described in the following.

The present inventors found out that addition of a plasticizer, in addition to polyvinyl alcohol, as components of a water-soluble packaging film, application of a predetermined amount of starch to the front surface and the rear surface of a water-soluble packaging film, and adjustment of a contact angle within a preferable range can inhibit roll contamination. Also, such a film has excellent unwinding properties to be able to pass through processing steps smoothly, resulting in improved productivity. Moreover, the water-soluble packaging film has enhanced water solubility, chemical resistance, visibility, and packaging properties. The present invention was thus completed.

Each component of the PVA aqueous solution of the present invention is specifically described in the following.
(Polyvinyl Alcohol (PVA))

The water-soluble packaging film of the present invention contains polyvinyl alcohol.

The polyvinyl alcohol is a main constituent material of the water-soluble packaging film of the present invention.

The polyvinyl alcohol is obtained by polymerizing a vinyl ester to prepare a polymer and saponifying, namely hydrolyzing the polymer in accordance with a conventionally known method. For saponification, an alkali or an acid is commonly used. Preferably, an alkali is used for saponification. As the polyvinyl alcohol, one type of polyvinyl alcohol may be used or two or more types of polyvinyl alcohols may be used in combination.

Examples of the vinyl ester include vinyl acetate, vinyl formate, vinyl propionate, vinyl butyrate, vinyl pivalate, vinyl versatate, vinyl laurate, vinyl stearate, and vinyl benzoate.

The vinyl ester may be polymerized by any method. Examples of the polymerization method include solution polymerization, bulk polymerization, and suspension polymerization.

Examples of a polymerization catalyst used in polymerization of the vinyl ester include 2-ethylhexyl peroxydicarbonate ("TrigonoxEHP" produced by Tianjin McEIT Co., ltd.), 2,2'-azobisisobutyronitrile (AIBN), t-butyl peroxyneodecanoate, bis(4-t-butylcyclohexyl) peroxydicarbonate, di-n-propyl peroxydicarbonate, di-n-butyl peroxydicarbonate, di-cetyl peroxydicarbonate, and di-sec-butyl peroxydicarbonate. These polymerization catalysts may be used alone, or in combination of two or more.

The polymer obtained by polymerizing the vinyl ester is preferably a polyvinyl ester because the saponification degree can be easily controlled within a preferable range. The polymer obtained by polymerizing the vinyl ester may be a copolymer of the vinyl ester and another monomer. The polyvinyl alcohol may be prepared from a copolymer of a vinyl ester and another monomer. Examples of the other monomer, namely, a co-monomer to be copolymerized, include olefins, (meth)acrylic acid and salts thereof, (meth)acrylates, (meth)acrylamide derivatives, N-vinyl amides, vinyl ethers, nitriles, vinyl halides, allyl compounds, maleic acid and salts thereof, maleates, itaconic acid and salts thereof, itaconates, vinylsilyl compounds, and isopropenyl acetate. The other monomers may be used alone, or in combination of two or more.

Examples of the olefins include ethylene, propylene, 1-butene, and isobutene. Examples of the (meth)acrylates include methyl (meth)acrylate, ethyl (meth)acrylate, n-propyl (meth)acrylate, i-propyl (meth)acrylate, n-butyl (meth)acrylate, and 2-ethylhexyl (meth)acrylate. Examples of the (meth)acrylamide derivatives include acrylamide, N-methylacrylamide, N-ethylacrylamide, N,N-dimethylacrylamide, and (meth)acrylamidepropanesulfonic acid and salts thereof. Examples of the N-vinyl amides include N-vinylpyrrolidone. Examples of the vinyl ethers include methyl vinyl ether, ethyl vinyl ether, n-propyl vinyl ether, i-propyl vinyl ether, and n-butyl vinyl ether. Examples of the nitriles include (meth)acrylonitrile. Examples of the vinyl halides include vinyl chloride and vinylidene chloride. Examples of the allyl compounds include allyl acetate and allyl chloride. Examples of the vinylsilyl compounds include vinyltrimethoxysilane.

In the case where the polyvinyl alcohol and the other monomer are copolymerized to prepare a modified PVA, the modification amount is preferably 15 mol % or lower, more preferably 5 mol % or lower. In other words, in 100 mol % of the total of the amount of a structural unit derived from a vinyl ester and the amount of a structural unit derived from the other monomer in the modified PVA, the structural unit derived from the vinyl ester preferably constitutes 85 mol % or more, more preferably 95 mol % or more, and the structural unit derived from the other monomer preferably constitutes 15 mol % or less, more preferably 5 mol % or less. As used herein, the polyvinyl alcohol includes modified polyvinyl alcohol (modified PVA).

The modified PVA is preferably prepared by modification with a hydrophilic group.

The hydrophilic group is preferably at least one selected from the group consisting of a sulfonic acid group, a pyrrolidone ring group, an amino group, and a carboxyl group. In particular, more preferred are a sulfonic acid group and a pyrrolidone ring group. The hydrophilic group includes salts such as sodium or potassium, in addition to the above functional groups.

The modified PVA prepared through modification with the hydrophilic group include, in addition to those obtained by copolymerizing the polyvinyl alcohol and another monomer having the hydrophilic group, those obtained by adding a hydrophilic group to the polyvinyl alcohol.

Examples of the modified PVA include pyrrolidone ring-modified polyvinyl alcohol, sodium sulfonate-modified polyvinyl alcohol, amino group-modified polyvinyl alcohol, and carboxyl group-modified polyvinyl alcohol.

When the modified PVA is a pyrrolidone ring-modified polyvinyl alcohol, the pyrrolidone ring-modified polyvinyl alcohol preferably has a structure unit represented by the following formula (1):

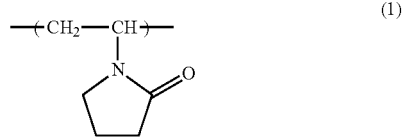

When the modified PVA is a sodium sulfonate-modified polyvinyl alcohol, the sodium sulfonate-modified polyvinyl alcohol preferably has a structure unit represented by the following formula (2):

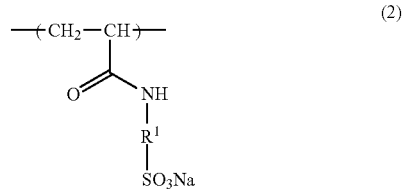

wherein $R^1$ represents a C1-C4 alkylene group.

When the modified PVA is an amino group-modified polyvinyl alcohol, the amino group-modified polyvinyl alcohol preferably has a structure unit represented by the following formula (3):

wherein $R^2$ represents a single bond or a C1-C10 alkylene group.

When the modified PVA is a carboxyl group-modified polyvinyl alcohol, the carboxyl group-modified polyvinyl alcohol preferably has a structure unit represented by the following formula (4-1), (4-2), or (4-3):

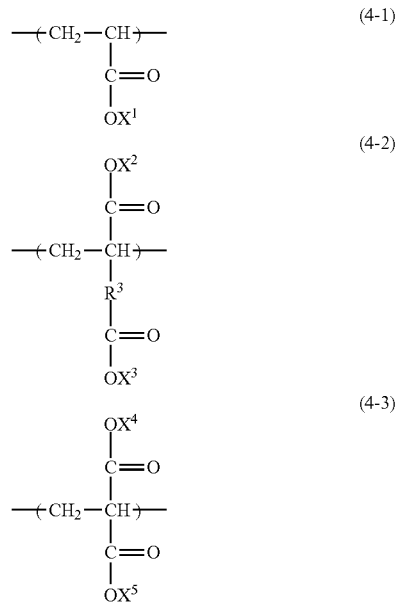

wherein $X^1$, $X^2$, $X^3$, $X^4$, and $X^5$ each independently represent a hydrogen atom, a metal atom, or a methyl group. In other words, the carboxyl group included in the structure unit having a carboxyl group as used herein includes salts and methyl esters of carboxyl groups. Examples of the metal atom include sodium atom.

In the formula (4-2), $R^3$ represents a C1-C10 alkylene group.

Exemplary commercial products of the modified PVA include "KL-318", "KL-118", "KM-618", and "KM-118" (all produced by Kuraray Co., Ltd.).

Regarding the amount of the structure unit having a hydrophilic group in the modified PVA, the lower limit is preferably 0.1 mol %, more preferably 0.2 mol %, still more preferably 0.5 mol %, particularly preferably 1 mol %, and the upper limit is preferably 15 mol %, more preferably 10 mol %, still more preferably 8 mol %. When the amount of the structure unit having a hydrophilic group satisfies the above lower limit and the upper limit, the film obtained is resistant to chlorine-containing sanitary agents or oxidizing chemicals, namely, not colored or torn by such agents or chemicals over a long period of time.

Regarding the saponification degree of the polyvinyl alcohol, the lower limit is preferably 80 mol %, more preferably 85 mol %, still more preferably 88 mol %, particularly preferably 90 mol %, further particularly preferably 92 mol %, and the upper limit is preferably 99.9 mol %, more preferably 99.0 mol %, still more preferably 98 mol %, particularly preferably 97 mol %, further particularly preferably 96 mol %. When the saponification degree satisfies the above lower limit and the upper limit, the water resistance of the water-soluble packaging film and the dissolution time thereof upon release of chemicals are easily controlled. From the standpoint of improving the water resistance and facilitating the control of the dissolution time in a balanced manner, the saponification degree of the PVA is particularly preferably 85 mol % or higher and 96 mol % or lower.

The saponification degree is measured in conformity with JIS K6726. The saponification degree indicates the proportion of units actually saponified to vinyl alcohol units among units to be converted to vinyl alcohol units by saponification.

The saponification degree may be adjusted by any method. The saponification degree can be appropriately adjusted by saponification conditions, namely, hydrolysis conditions.

The PVA has a standard deviation ($\sigma$) of saponification degree distribution of preferably 0.1 to 1.0 mol %.

When the standard deviation of saponification degree distribution satisfies the above lower limit and the upper limit, the solubility and the chemical resistance of the water-soluble packaging film are enhanced, and both the dissolution time upon release of chemicals and the storage period when packaging chemicals therein are enhanced in a balanced manner.

Regarding the standard deviation of saponification degree distribution of the PVA, the lower limit is more preferably 0.2 mol % and the upper limit is more preferably 0.9 mol %.

The standard deviation of saponification degree distribution is an index showing variations of the saponification degree in PVA, and can be calculated based on the measurement by FT-IR or the like.

The PVA may have any polymerization degree. The lower limit of the polymerization degree of the PVA is preferably 400, more preferably 500, still more preferably 600, particularly preferably 900, and the upper limit thereof is preferably 2000, more preferably 1800, still more preferably 1500. When the polymerization degree satisfies the above lower limit and the upper limit, an aqueous solution thereof has an appropriate viscosity for formation of a water-soluble packaging film. When the polymerization degree satisfies the above upper limit, the water-soluble packaging film has better strength to have water resistance. The polymerization degree is measured in conformity with JIS K6726.

Regarding the viscosity of a 4% by weight aqueous solution of the PVA measured at 20° C., the lower limit is preferably 3 mPa·s and the upper limit thereof is preferably 35 mPa·s. More preferably, the lower limit is 5 mPa·s and the upper limit is 30 mPa·s. When the viscosity is 3 mPa·s or higher, the water resistance can be improved. When the viscosity is 35 mPa·s or lower, the dissolution time can be shortened. The lower limit of the viscosity is more preferably 8 mPa·s and the upper limit is more preferably 20 mPa·s.

The viscosity can be measured in conformity with JIS K6726.

In 100% by weight of the water-soluble packaging film of the present invention, the lower limit of the polyvinyl alcohol content is preferably 70% by weight and the upper limit thereof is preferably 97% by weight.

When the polyvinyl alcohol content satisfies the above lower limit, the water-soluble packaging film may be a better-quality film without bleeding of a plasticizer therefrom. When the polyvinyl alcohol content satisfies the above upper limit, the water-soluble packaging film may have further better strength to have water resistance.

The water-soluble packaging film of the present invention contains a plasticizer.

The water-soluble packaging film is required to have high tensile strength and high durability because it may be conveyed, stored, or used in hot and humid regions or cold regions. Especially, impact resistance at low temperatures is considered to be important. Containing a plasticizer, the water-soluble packaging film of the present invention can have a lower glass transition point, which improves the durability of the film at low temperatures. Containing the plasticizer, the water-soluble packaging film can also have better solubility in water.

The plasticizer may be any plasticizer commonly used as a plasticizer for PVA. Examples thereof include: polyhydric alcohols such as glycerin, diglycerin, diethylene glycol, trimethylolpropane, triethylene glycol, dipropylene glycol, and propylene glycol; polyethers such as polyethylene glycol and polypropylene glycol; phenol derivatives such as bisphenol A and bisphenol S; amide compounds such as N-methylpyrrolidone; compounds prepared by adding ethylene oxide to polyhydric alcohols such as glycerin, pentaerythritol, and sorbitol; and water. These may be used alone, or in combination of two or more.

Among the above plasticizers, preferred are glycerin, trimethylolpropane, polyethylene glycol, polypropylene glycol, triethylene glycol, dipropylene glycol, and propylene glycol because water solubility can be improved. Since the water solubility is markedly improved, particularly preferred are glycerin and trimethylolpropane.

In the water-soluble packaging film of the present invention, the lower limit of the amount of the plasticizer based on 100 parts by weight of polyvinyl alcohol is preferably 3 parts by weight, and the upper limit thereof is preferably 15 parts by weight. When the amount of the plasticizer is less than 3 parts by weight, the effect of adding the plasticizer may not be achieved. When the amount of the plasticizer is more than 15 parts by weight, bleeding of the plasticizer becomes great, possibly lowering the anti-blocking properties of the water-soluble packaging film to be obtained.

The lower limit of the amount of the plasticizer is more preferably 3.2 parts by weight, and the upper limit thereof is more preferably 13 parts by weight.

The water-soluble packaging film of the present invention contains starch.

In the water-soluble packaging film of the present invention, the starch is applied to the front surface and the rear surface of the water-soluble packaging film. Application of the starch allows the water-soluble packaging film of the present invention to have improved unwinding properties, and excellent anti-blocking properties and process passing properties.

Here, the front surface and the rear surface of the water-soluble packaging film refer to a main surface on one side and a main surface on the other side of the water-soluble packaging film.

In the present invention, application includes spraying, immersion, and the like, in addition to application, and refers to an action of attaching starch to at least a part of the front surface and the rear surface.

Any starch may be used in the present invention, and examples thereof include: starch derived from corn, wheat, potato, tapioca, taro, sweet potato, rice, or the like; modified starch such as pregelatinized starch, dextrin, oxidized starch, aldehydized starch, esterified starch, etherified starch, cationized starch, and crosslinked starch; raw corn starch, oxidized corn starch, etherified corn starch, potato starch phosphate, and acetylated wheat starch. These may be used alone or in combination of two or more. In view of the process passing properties of the water-soluble packaging film to be obtained in a bag-making machine or the like, preferably, the compatibility between polyvinyl alcohol and starch is somewhat low and the film has a satin-finished surface. In consideration of this, preferable examples of starch include starch derived from corn, starch derived from sweet potato, raw corn starch, oxidized corn starch, etherified corn starch, potato starch phosphate, and acetylated wheat starch. Particularly preferred are starch derived from corn, starch derived from sweet potato, and oxidized corn starch because minute irregularities are favorably formed on the film surface.

The lower limit of the application amount of the starch is 0.001 g per 1 $m^2$ of the water-soluble packaging film, and the upper limit thereof is 0.10 g per 1 $m^2$. When the application amount of the starch is 0.001 g or more per 1 $m^2$ of the water-soluble packaging film, the unwinding properties are favorable and the anti-blocking properties and process passing properties can be improved. When the application amount of the starch is 0.10 g or less per 1 $m^2$ of the water-soluble packaging film, deposition of starch to a conveying roll during packaging of chemicals can be inhibited, thereby improving the productivity. Preferably, the lower limit of the application amount of the starch is 0.005 g per 1 $m^2$ of the water-soluble packaging film and the upper limit thereof is 0.07 g per 1 $m^2$.

The application amount herein means the amount of starch applied to the front surface and the rear surface of the water-soluble packaging film.

The lower limit of the amount of the starch is preferably 0.001 parts by weight based on 100 parts by weight of the polyvinyl alcohol resin, and the upper limit thereof is preferably 1 part by weight. When the amount of the starch is 0.001 parts by weight or more based on 100 parts by weight of the polyvinyl alcohol resin, the rewinding properties are favorable and the anti-blocking properties and process passing properties can be improved. When the amount of the starch is 1 part by weight or less, deposition of starch to a conveying roll during packaging of chemicals can be inhibited, thereby improving the productivity. More preferably, the lower limit of the amount of the starch is 0.05 parts by weight based on 100 parts by weight of the polyvinyl alcohol resin and the upper limit thereof is 0.7 parts by weight.

The starch may have any shape, and examples thereof include granules, powder, and flakes. Particularly preferred is powder starch.

The lower limit of the average particle size of the starch is preferably 5 µm, and the upper limit thereof is preferably 40 µm. When the average particle size is 5 µm or larger, the visibility of the film can be maintained. When the average particle size is 40 µm or smaller, the water-soluble packaging film to be obtained can inhibit roll contamination.

The average particle size can be measured for example with an optical microscope, an electron microscope, or a particle size distribution analyzer by laser diffraction or the like.

The water-soluble packaging film of the present invention preferably has an orientation of 0.5 to 9.9 nm.

When the orientation satisfies the lower limit and the upper limit, the water-soluble packaging film has better solubility and packaging properties, so that both the dissolution time upon release of contents and the storage properties when packaging contents can be improved in a balanced manner.

More preferably, the lower limit of the orientation is 1.0 nm and the upper limit thereof is 8.0 nm.

The orientation indicates an index showing the regularity of PVA molecular arrangement in the water-soluble packaging film, and can be determined with a phase-difference measuring apparatus (KOBRA-WR, produced by Oji Scientific Instruments).

The upper limit of the thickness of the water-soluble packaging film of the present invention is preferably 100 µm, more preferably 80 µm, still more preferably 75 µm. The lower limit of the thickness of the water-soluble packaging film of the present invention is preferably 10 µm. When the thickness of the water-soluble packaging film satisfies the lower limit, the film for packaging chemicals has still higher strength. When the thickness of the water-soluble packaging film satisfies the upper limit, the water-soluble packaging film has still higher packaging properties or heat sealing properties. Moreover, the processing time is further shortened to further improve the productivity.

The water-soluble packaging film of the present invention may further appropriately contain common additives such as colorants, flavoring agents, bulking agents, defoamers, releasing agents, ultraviolet absorbers, and surfactants, if needed. Particularly, for the purpose of improving the releasability between the metal surface of a die or a drum of a film forming machine and a formed film or a stock solution of a film, the amount added of the surfactant is preferably 0.01 to 5 parts by weight based on 100 parts by weight of PVA.

In the water-soluble packaging film of the present invention, the lower limit of the contact angle with distilled water measured by the sessile-drop method is 20°, and the upper limit thereof is 50°. When the contact angle is 20° or larger, the water-soluble packaging film to be obtained can have excellent rewinding properties. When the contact angle is 50° or smaller, the water-soluble packaging film to be obtained can inhibit roll contamination. The lower limit of the contact angle is preferably 23°, more preferably 30°, whereas the upper limit thereof is preferably 49°, more preferably 40°.

The contact angle can be measured in conformity with JIS R 3257. For example, the contact angle can be measured by dripping distilled water on a water-soluble packaging film using a contact angle measurement apparatus Theta Lite (Biolin Scientific Holding AB.).

(Production Method of Water-Soluble Packaging Film)

The water-soluble packaging film of the present invention may be produced by any method, and is produced by, for example, casting a PVA aqueous solution containing PVA, a plasticizer, and water on a support member, drying the casted solution, and applying starch to the front surface and the rear surface of the obtained PVA film. Specific examples of the production method include solution casting, roll coating, spin coating, screen coating, fountain coating, dipping, and spraying.

The PVA aqueous solution contains water together with the PVA and the plasticizer. The PVA is mainly dissolved in the water.

In the PVA aqueous solution, the water content based on 100 parts by weight of the components (including the PVA) other than water is 300 parts by weight or more, preferably 400 parts by weight or more, more preferably 500 parts by weight or more. The water content is 900 parts by weight or less, preferably 800 parts by weight or less, more preferably 700 parts by weight or less. When the water content satisfies the lower limit, the viscosity of the PVA aqueous solution is appropriately low. In such a case, casting of the PVA aqueous solution is facilitated. When the water content satisfies the upper limit, the viscosity of the PVA aqueous solution is appropriately high. In such a case, casting of the PVA aqueous solution is facilitated, and the drying time is further shortened, resulting in production of a higher-quality water-soluble packaging film in which the orientation of the water-soluble packaging film is further improved.

The support member is preferably capable of keeping the PVA aqueous solution on its surface upon casting of the PVA aqueous solution and supporting a PVA film to be obtained. The support member is made of, for example, a polyolefin, a polyester, an acrylic resin, or the like. Alternatively, the support member may be made of a material other than the above materials. Examples of the polyolefin include ethylene, polypropylene, ethylene-vinyl acetate copolymers, and ethylene-vinyl alcohol copolymers. Examples of the polyester include polyethylene terephthalate and polyethylene naphthalate. The support member is preferably not made of PVA.

The PVA aqueous solution casted on the support member may be dried by any appropriate method. Examples of the drying method include natural drying and drying with heat at a temperature not higher than the glass transition temperature of PVA.

Starch may be applied to the PVA film by any method, and examples thereof include atomization (spraying, misting), transferring (sponge roll, gravure roll), and immersion (dipping).

Upon production of the water-soluble packaging film of the present invention, the film may be stretched during or after the drying. Such a stretching step can more favorably enhance the orientation of the water-soluble packaging film.

The stretching step may be performed by a method such as stretching with a roll, stretching with a tenter, stretching with a winding device, stretching utilizing drying shrinkage, or a combination of these. In the case of performing the stretching step, starch is preferably applied after the stretching step.

The stretch ratio in the stretching step is preferably 1.01 to 3 times. The stretch ratio is more preferably 1.1 to 2 times.

The water-soluble packaging film may be used, for example, as a film for packaging chemicals such as detergents, agrochemicals, or pharmaceuticals.

Advantageous Effects of Invention

The present invention can provide a water-soluble packaging film which is capable of inhibiting roll contamination, which has favorable unwinding properties to exhibit excellent process passing properties, thereby improving the productivity, and which has enhanced water solubility, chemical resistance, visibility, and packaging properties.

DESCRIPTION OF EMBODIMENTS

Embodiments of the present invention are further specifically described in the following with reference to, but not limited to, examples.

Example 1

An amount of 90 parts by weight of pyrrolidone ring-modified polyvinyl alcohol (polymerization degree: 1000, saponification degree: 95.8 mol %, standard deviation of saponification degree distribution: 0.21 mol %, modification amount with pyrrolidone ring: 4 mol %, viscosity of 4% by weight aqueous solution: 10 mPa·s) having a structure unit represented by the formula (1) as polyvinyl alcohol, and 5.0 parts by weight of glycerin (Wako Pure Chemical Industries, Ltd.) and 5.0 parts by weight of trimethylolpropane (Wako Pure Chemical Industries, Ltd.) as plasticizers were dissolved in 667 parts by weight of water to prepare a 15% by weight aqueous solution.

The standard deviation of saponification degree distribution of the polyvinyl alcohol was measured as follows.

(Measurement of Standard Deviation of Saponification Degree Distribution)

Forty polyvinyl alcohol particles were randomly selected, and the acetyl group content of the polyvinyl alcohol was measured with a FT-IR spectrophotometer (produced by Shimadzu Corporation, IRAffinity-1) by ATR method. Based on the measured acetyl group content, the saponification degree of each particle was determined. Based on variations of the obtained saponification degrees, the standard deviation ($\sigma$) of saponification degree distribution was calculated.

The obtained PVA aqueous solution was applied to a polyethylene terephthalate (PET) film (thickness: 50 µm) as a support member with a lip coater, dried at 70° C. for 10 minutes and then at 110° C. for 10 minutes, and wound on a paper core (inner diameter: 3 inches) to prepare a wound body of a laminated film including a PVA film (thickness: 50 µm) laminated on a support member. The support member was peeled off from the obtained wound body of a laminated film to prepare a PVA film. Starch derived from sweet potato (average particle size: 20 µm, produced by Wako Pure Chemical Industries, Ltd.) was applied to the front surface and the rear surface of the PVA film by a powder spray device (produced by Nikka Ltd., "K-III") in such a manner that the amount of the applied starch was 0.07 g per 1 m$^2$ of a water-soluble packaging film to be obtained. A water-soluble packaging film was thus obtained.

Example 2

An amount of 95.1 parts by weight of unmodified polyvinyl alcohol (polymerization degree: 1300, saponification degree: 88.0 mol %, standard deviation of saponification degree distribution: 0.73 mol %, viscosity of 4% by weight aqueous solution: 14 mPa·s) as polyvinyl alcohol, and 3.3 parts by weight of glycerin (Wako Pure Chemical Industries, Ltd.), 0.8 parts by weight of trimethylolpropane (Wako Pure Chemical Industries, Ltd.), and 0.8 parts by weight of Polyethylene Glycol 600 (Wako Pure Chemical Industries, Ltd.) as plasticizers were dissolved in 667 parts by weight of water to prepare a 15% by weight aqueous solution.

A wound body of a laminate film including a PVA film (thickness: 50 µm) was produced in the same manner as in Example 1. The support member was peeled off from the obtained wound body of a laminated film to prepare a PVA film. A water-soluble packaging film was obtained in the same manner as in Example 1 by applying starch derived from corn (average particle size: 20 µm, Wako Pure Chemical Industries, Ltd.) to the front surface and the rear surface of the PVA film in such a manner that the amount of the applied starch was 0.005 g per 1 m$^2$ of the water-soluble packaging film.

Example 3

A water-soluble packaging film was prepared in the same manner as in Example 1, except that the polyvinyl alcohol used was sodium sulfonate-modified polyvinyl alcohol A (polymerization degree: 1200, saponification degree: 95.4 mol %, standard deviation of saponification degree distribution: 0.31 mol %, modification amount with sulfonic acid group: 4 mol %, viscosity of 4% by weight aqueous solution: 12 mPa·s) having a structure unit represented by the formula (2) in which $R^1$ represents a 2-methylenepropylene group, and that starch derived from corn (average particle size: 20 µm) was applied in an amount of 0.01 g per 1 m$^2$ of the water-soluble packaging film.

Example 4

A water-soluble packaging film was prepared in the same manner as in Example 1, except that the polyvinyl alcohol used was amino group-modified polyvinyl alcohol (polymerization degree: 600, saponification degree: 91.8 mol %, standard deviation of saponification degree distribution: 0.28 mol %, modification amount with amino group: 8 mol %, viscosity of 4% by weight aqueous solution: 6 mPa·s) having a structure unit represented by the formula (3) in which $R^2$ represents a single bond, and that starch derived from sweet potato (average particle size: 10 µm, Wako Pure Chemical Industries, Ltd.) was applied in an amount of 0.01 g per 1 m$^2$ of the water-soluble packaging film.

Example 5

A water-soluble packaging film was prepared in the same manner as in Example 1, except that the polyvinyl alcohol used was carboxylic acid-modified polyvinyl alcohol (Kuraray Co., Ltd., KL-118, polymerization degree: 1700, saponification degree: 97.5 mol %, standard deviation of saponification degree distribution: 0.25 mol %, modification amount with carboxyl group: 1.5 mol %, viscosity of 4% by weight aqueous solution: 30 mPa·s) having a structure unit represented by the formula (4-2) in which $R^3$ represents a methylene group, and $X^2$ and $X^3$ each represent a sodium atom, and that starch derived from sweet potato (average particle size: 30 µm, Wako Pure Chemical Industries, Ltd.) was applied in an amount of 0.01 g per 1 m$^2$ of the water-soluble packaging film.

Example 6

A water-soluble packaging film was prepared in the same manner as in Example 1, except that the polyvinyl alcohol used was sodium sulfonate-modified polyvinyl alcohol B (polymerization degree: 1200, $R^1$=$CH_2$, saponification degree: 90.1 mol %, standard deviation of saponification degree distribution: 0.98 mol %, modification amount with sulfonic acid group: 4 mol %, viscosity of 4% by weight aqueous solution: 10 mPa·s) having a structure unit represented by the formula (2), and that the starch derived from sweet potato (average particle size: 30 µm, Wako Pure Chemical Industries, Ltd.) was applied in an amount of 0.01 g per 1 m$^2$ of the water-soluble packaging film.

Example 7

An amount of 90 parts by weight of unmodified polyvinyl alcohol (polymerization degree: 1300, saponification degree: 98.0 mol %, standard deviation of saponification degree distribution: 0.18 mol %, viscosity of 4% by weight aqueous solution: 17 mPa·s), and 5.0 parts by weight of glycerin (Wako Pure Chemical Industries, Ltd.) and 5.0 parts by weight of trimethylolpropane (Wako Pure Chemical Industries, Ltd.) as plasticizers were dissolved in 667 parts by weight of water to prepare a 15% by weight aqueous solution.

The obtained PVA aqueous solution was applied to a polyethylene terephthalate (PET) film (thickness: 50 μm) as a support member with an auto film applicator (produced by Tester Sangyo Co., Ltd., "PI-1210"), and dried at 80° C. for 20 minutes to produce a PVA film (thickness: 50 μm) on the support member. After removal of the support member from the obtained PVA film, the resulting water-soluble packaging film was exposed to an environment at a temperature of 23° C. and a relative humidity of 50% RH for 24 hours.

Then, the water-soluble packaging film was cut to a size of 600 mm×500 mm and set on a tensile tester such that the width of the film was 500 mm. After stretching of the film to the width of 900 mm (stretch ratio: 1.8 times), starch derived from sweet potato (average particle size: 30 μm, Wako Pure Chemical Industries, Ltd.) was applied to the front surface and the rear surface of the PVA film in an amount of 0.01 g per 1 m² of a water-soluble packaging film to be obtained. A water-soluble packaging film was thus prepared.

Example 8

A water-soluble packaging film was prepared in the same manner as in Example 1, except that the starch derived from sweet potato (average particle size: 20 μm, Wako Pure Chemical Industries, Ltd.) was changed to starch derived from tapioca (average particle size of 20 μm, Gaban Co., Ltd.).

Comparative Example 1

An amount of 91 parts by weight of sodium sulfonate-modified polyvinyl alcohol (polymerization degree: 1200, saponification degree: 95.4 mol %, standard deviation of saponification degree distribution: 0.31 mol %, modification amount with sulfonic acid group: 4 mol %, viscosity of 4% by weight aqueous solution: 12 mPa·s) having a structure unit represented by the formula (2) in which $R^1$ represents a 2-methylenepropylene group as polyvinyl alcohol, and 4.0 parts by weight of glycerin (Wako Pure Chemical Industries, Ltd.), 3.0 parts by weight of trimethylolpropane (Wako Pure Chemical Industries, Ltd.), and 2.0 parts by weight of Polyethylene Glycol 600 (Wako Pure Chemical Industries, Ltd.) as plasticizers were dissolved in 667 parts by weight of water to prepare a 15% by weight aqueous solution.

A wound body of a laminated film including a PVA film (thickness: 50 μm) was produced in the same manner as in Example 1. The support member was peeled off from the obtained wound body of a laminated film to prepare a water-soluble packaging film.

Comparative Example 2

A water-soluble packaging film was produced in the same manner as in Example 2, except that the starch derived from corn (average particle size: 20 μm) was applied in an amount of 0.11 g per 1 m² of the water-soluble packaging film.

Comparative Example 3

A water-soluble packaging film was produced in the same manner as in Example 2, except that the starch derived from sweet potato (average particle size: 30 μm) was applied in an amount of 0.0001 g per 1 m² of the water-soluble packaging film.

Comparative Example 4

The water-soluble packaging film obtained in Comparative Example 1 was embossed in a lattice pattern to give a water-soluble packaging film having a thickness at a recess of 17 μm, a height difference between a recess and a projection of 30 μm, a groove width of 0.1 mm, and a groove interval of 0.1 mm.

Comparative Example 5

An amount of 95.05 parts by weight of unmodified polyvinyl alcohol (polymerization degree: 1300, saponification degree: 88.0 mol %, standard deviation of saponification degree distribution: 0.73 mol %, viscosity of 4% by weight aqueous solution: 14 mPa·s) as polyvinyl alcohol, 3.3 parts by weight of glycerin (Wako Pure Chemical Industries, Ltd.), 0.8 parts by weight of trimethylolpropane (Wako Pure Chemical Industries, Ltd.), and 0.8 parts by weight of Polyethylene Glycol 600 (Wako Pure Chemical Industries, Ltd.) as plasticizers, and 0.05 parts by weight of starch derived from corn (average particle size: 20 μm, Wako Pure Chemical Industries, Ltd.) were dissolved in 667 parts by weight of water to prepare a 15% by weight aqueous solution.

In the same manner as in Example 1, a wound body of a laminated film including a PVA film (thickness: 50 μm) was prepared. The support member was peeled off from the obtained wound body of a laminated film to prepare a water-soluble packaging film. The obtained water-soluble packaging film contained starch inside thereof, and no deposition of the starch on the film surface was observed.

Comparative Example 6

An amount of 100 parts by weight of unmodified polyvinyl alcohol (polymerization degree: 1300, saponification degree: 88.0 mol %, standard deviation of saponification degree distribution: 0.73 mol %, viscosity of 4% by weight aqueous solution: 14 mPa·s) as polyvinyl alcohol was dissolved in 667 parts by weight of water to prepare a 15% by weight aqueous solution.

A wound body of a laminated film including a PVA film (thickness: 50 μm) was prepared in the same manner as in Example 1. The support member was peeled off from the obtained wound body of a laminated film to prepare a water-soluble packaging film.

Comparative Example 7

A water-soluble packaging film was prepared in the same manner as in Comparative Example 6, except that starch derived from sweet potato (average particle size: 20 μm) was applied to the front surface and the rear surface of the PVA film in an amount of 0.01 g per 1 m² of the water-soluble packaging film.

Comparative Example 8

A water-soluble packaging film was produced in the same manner as in Example 1, except that the starch derived from sweet potato (average particle size: 20 μm, Wako Pure Chemical Industries, Ltd.) was changed to rosin (average particle size: 20 μm, MIKASA CORPORATION).

TABLE 1

| | Composition of polyvinyl alcohol aqueous solution Polyvinyl alcohol resin | | | | | | |
|---|---|---|---|---|---|---|---|
| | Polymerization degree | Saponification degree (mol %) | Standard deviation of saponification degree distribution σ (mol %) | Modifying group | Amount of modifying group (mol %) | Viscosity of 4 wt % aqueous solution (mPa · s) | Amount added (parts by weight) |
| Example 1 | 1000 | 95.8 | 0.21 | Pyrrolidone ring group | 4 | 10 | 90 |
| Example 2 | 1300 | 88.0 | 0.73 | — | — | 14 | 95.1 |
| Example 3 | 1200 | 95.4 | 0.31 | Sulfonic acid group | 4 | 12 | 90 |
| Example 4 | 600 | 91.8 | 0.28 | Amino group | 8 | 6 | 90 |
| Example 5 | 1700 | 97.5 | 0.25 | Carboxyl group | 1.5 | 30 | 90 |
| Example 6 | 1200 | 90.1 | 0.98 | Sulfonic acid group | 4 | 10 | 90 |
| Example 7 | 1300 | 98.0 | 0.18 | — | — | 17 | 90 |
| Example 8 | 1000 | 95.8 | 0.21 | Pyrrolidone ring group | 4 | 10 | 90 |
| Comparative Example 1 | 1200 | 95.4 | 0.31 | Sulfonic acid group | 4 | 12 | 91 |
| Comparative Example 2 | 1300 | 88.0 | 0.73 | — | — | 14 | 95.1 |
| Comparative Example 3 | 1300 | 88.0 | 0.73 | — | — | 14 | 95.1 |
| Comparative Example 4 | 1200 | 95.4 | 0.31 | Sulfonic acid group | 4 | 12 | 91 |
| Comparative Example 5 | 1300 | 88.0 | 0.73 | — | — | 14 | 95.05 |
| Comparative Example 6 | 1300 | 88.0 | 0.73 | — | — | 14 | 100 |
| Comparative Example 7 | 1300 | 88.0 | 0.73 | — | — | 14 | 100 |
| Comparative Example 8 | 1000 | 95.8 | 0.21 | Pyrrolidone ring group | 4 | 10 | 90 |

| | Composition of polyvinyl alcohol aqueous solution | | | | | Applied starch | |
|---|---|---|---|---|---|---|---|
| | Plasticizer (parts by weight) | | | Starch | Stretch | | Application |
| | Glycerin | Trimethylol propane | Polyethylene glycol 6000 | (parts by weight) | ratio (times) | Kind | amount (g/m²) |
| Example 1 | 5.0 | 5.0 | — | — | 1 | Derived from sweet potato | 0.07 |
| Example 2 | 3.3 | 0.8 | 0.8 | — | 1 | Derived from corn | 0.005 |
| Example 3 | 5.0 | 5.0 | — | — | 1 | Derived from corn | 0.01 |
| Example 4 | 5.0 | 5.0 | — | — | 1 | Derived from sweet potato | 0.01 |
| Example 5 | 5.0 | 5.0 | — | — | 1 | Derived from sweet potato | 0.01 |
| Example 6 | 5.0 | 5.0 | — | — | 1 | Derived from sweet potato | 0.01 |
| Example 7 | 5.0 | 5.0 | — | — | 1.8 | Derived from sweet potato | 0.01 |
| Example 8 | 5.0 | 5.0 | — | — | 1 | Derived from tapioca | 0.07 |
| Comparative Example 1 | 4.0 | 3.0 | 2.0 | — | 1 | — | 0 |
| Comparative Example 2 | 3.3 | 0.8 | 0.8 | — | 1 | Derived from corn | 0.11 |
| Comparative Example 3 | 3.3 | 0.8 | 0.8 | — | 1 | Derived from sweet potato | 0.0001 |
| Comparative Example 4 | 4.0 | 3.0 | 2.0 | — | 1 | — | 0 |
| Comparative Example 5 | 3.3 | 0.8 | 0.8 | 0.05 | 1 | — | 0 |
| Comparative Example 6 | 0 | 0 | 0 | — | 1 | — | 0 |
| Comparative Example 7 | 0 | 0 | 0 | — | 1 | Derived from sweet potato | 0.01 |
| Comparative Example 8 | 5.0 | 5.0 | — | — | 1 | Rosin | 0.07 |

(Evaluation)

The films obtained in the examples and comparative examples were evaluated for the following parameters. Table 2 shows the results.

(1) Contact Angle

The obtained water-soluble packaging film was cut to a size of 10 mm×30 mm. The obtained film piece was exposed to an environment at 50° C. for 24 hours, and then attached to a glass substrate. Then, about 5.0 μL of distilled water was dripped on the water-soluble packaging film, and an angle formed by the water-soluble packaging film and a tangent to the droplet was measured after one second from the drip by the sessile-drop method using a contact angle measurement apparatus "Theta lite" (Biolin Scientific Holding AB.) in an atmosphere at 23° C. and 50% RH.

(2) Roll Contamination

A wound body (50 mm width) of the obtained water-soluble packaging film was rewound on a metal roll for 50 m at a rewinding rate of 20 m/min in conformity with JIS 20237. The metal roll was run a finger, and whether the starch applied to the water-soluble packaging film was deposited on the metal roll was visually observed. Evaluation was performed based on the following criteria.

In the case of the water-soluble packaging film obtained in Comparative Example 1, the film was adhered to the metal roll during the conveyance, and therefore, observation of the roll contamination could not be performed.

∘∘ (Excellent): No deposition of starch was observed.
∘ (Good): Deposition of starch was slightly observed.
× (Poor): Starch was deposited to the extent that the finger get white upon contact with the roll, or observation could not be performed.

(3) Unwinding Properties

The obtained water-soluble packaging film was cut to a size of 80 mm×200 mm. The friction coefficient between the water-soluble packaging films was measured in conformity with JIS K7125 and evaluated based on the following criteria.

∘∘ (Excellent): Less than 0.8.
∘ (Good): 0.8 or more but less than 1.8.
× (Poor): 1.8 or more.

(4) Visibility

The haze of the obtained water-soluble packaging film was measured with a haze meter (produced by Tokyo Denshoku Co., Ltd., TC-H3DPK) at 20° C., and evaluated based on the following criteria.

∘ (Good): Haze of less than 3.5%.
× (Poor): Haze of 3.5% or more.

(5) Visibility After Durability Test

The obtained water-soluble packaging film was formed into a bag in a size of 5 cm×4 cm and allowed to contain 20 g of sodium trichloroisocyanurate therein. The bag was further put into an aluminum bag and sealed therein. The obtained bag was left in a constant temperature/humidity oven at a temperature of 40° C. and a humidity of 70% RH for a month. Then, the film portion was cut out from the bag, and the haze thereof was measured with a haze meter (produced by Tokyo Denshoku Co., Ltd., TC-H3DPK) at 20° C. The obtained haze was evaluated based on the following criteria.

∘ (Good): Haze was less than 3.5%.
× (Poor): Haze was 3.5% or more.

(6) Water Solubility (Dissolution Time)

The support member was peeled off from the obtained laminated film to prepare a water-soluble packaging film. The obtained water-soluble packaging film was exposed to an environment at a temperature of 23° C. and a relative humidity of 50% RH for 24 hours.

Then, the water-soluble packaging film was cut to a size of 35 mm×40 mm, and the obtained film piece was fixed to a jig. The film fixed to the jig was immersed in water (500 ml) in a 500-ml beaker under stirring (in such a manner that the bottom of a vortex reaches the metering line of 400 ml) with a stirrer while the water temperature was maintained at 23° C. The time until residues of the film was not any more observed on the jig was measured, and evaluated based on the following criteria.

∘∘ (Excellent): Shorter than 20 seconds.
∘ (Good): 20 seconds or longer but shorter than 30 seconds.
× (Poor): 30 seconds or longer.

(7) Long-Term Storability

The support member was peeled off from the obtained laminated film to prepare a water-soluble packaging film. The obtained packaging film was put into an aluminum zipper bag and left to stand in an environment at a temperature of 23° C. and a relative humidity of 50% RH for a month.

Then, the water-soluble packaging film was taken out and visually observed to check the presence of bleeding of the plasticizer or the additives from the film after the standing for a month. Evaluation was performed based on the following criteria.

∘ (Good): Film was transparent and had no bleeding therefrom.
× (Poor): Film was turbid and had bleeding therefrom.

(8) Orientation

The obtained water-soluble packaging film was exposed to an environment at a temperature of 23° C. and a relative humidity of 50% RH for 24 hours. Then, a phase difference R of the water-soluble packaging film was measured with a phase difference measuring apparatus (KOBRA-WR, produced by Oji Scientific Instruments) at an incident angle of 45°, and the numerical value of the measured phase difference R was taken as the value of the orientation.

(9) Packaging Properties

The obtained water-soluble packaging film was formed into bags in a size of 5 cm×4 cm. The bags were each allowed to contain 20 g of powder detergent and heat-sealed at 150° C. One hundred bags were left in a constant temperature/humidity oven at a temperature of 40° C. and a humidity of 70% RH for a month. Then, the sealing state of the water-soluble packaging film was visually observed.

∘ (Good): Defective sealing was observed in one or less bag.
× (Poor): Defective sealing was observed in two or more bags.

(10) Chemical Resistance

The obtained water-soluble packaging film was formed into a bag in a size of 5 cm×4 cm, and the bag was allowed to contain 20 g of sodium trichloroisocyanurate. The bag was further put into an aluminum bag and sealed. The resulting bag was left in a constant temperature/humidity oven at a temperature of 40° C. and a humidity of 70% RH for a month. Then, the appearance of the water-soluble packaging film was visually observed.

∘ (Good): The appearance was not changed.
× (Poor): The appearance was colored yellow or brown.

TABLE 2

| | | Evaluation | | | | | | | |
|---|---|---|---|---|---|---|---|---|---|
| | | | Unwinding properties | | | | Visibility after durability test | | |
| | Contact angle (°) | Roll contamination | Friction coefficient | Evaluation | Visibility | | Haze (%) | Change in haze (%) | Evaluation |
| | | | | | Haze | Evaluation | | | |
| Example 1 | 24.0 | ∘ | 0.5 | ∘∘ | 2.5 | ∘ | 2.6 | 4.0 | ∘ |
| Example 2 | 48.0 | ∘∘ | 1.6 | ∘ | 3 | ∘ | 3.4 | 13.3 | ∘ |

TABLE 2-continued

| | | | | | | | | | |
|---|---|---|---|---|---|---|---|---|---|
| Example 3 | 31.5 | ⊙⊙ | 0.7 | ⊙⊙ | 2.4 | ○ | 2.5 | 4.2 | ○ |
| Example 4 | 37.5 | ⊙⊙ | 1.2 | ○ | 3.1 | ○ | 3.2 | 3.1 | ○ |
| Example 5 | 33.1 | ⊙⊙ | 0.9 | ○ | 3.0 | ○ | 3.1 | 3.3 | ○ |
| Example 6 | 30.7 | ⊙⊙ | 0.6 | ⊙⊙ | 3.0 | ○ | 3.2 | 6.7 | ○ |
| Example 7 | 48.5 | ⊙⊙ | 1.5 | ○ | 2.6 | ○ | 2.8 | 7.7 | ○ |
| Example 8 | 25.8 | ○ | 0.6 | ⊙⊙ | 2.6 | ○ | 2.7 | 3.8 | ○ |
| Comparative Example 1 | 13.3 | Not evaluable | 2.8 | X | 2.3 | ○ | 2.4 | 4.3 | ○ |
| Comparative Example 2 | 13.3 | X | 0.2 | ⊙⊙ | 2.9 | ○ | 3.4 | 17.2 | ○ |
| Comparative Example 3 | 59.0 | ⊙⊙ | 1.9 | X | 2.7 | ○ | 3.3 | 22.2 | ○ |
| Comparative Example 4 | 13.3 | ⊙⊙ | 0.7 | ⊙⊙ | 67.5 | X | 67.7 | 0.3 | X |
| Comparative Example 5 | 59.7 | ⊙⊙ | 2.1 | X | 3.2 | ○ | 3.4 | 6.3 | ○ |
| Comparative Example 6 | 53.0 | ⊙⊙ | 0.4 | ⊙⊙ | 2.2 | ○ | 3.2 | 45.5 | ○ |
| Comparative Example 7 | 50.8 | ○ | 0.3 | ⊙⊙ | 2.3 | ○ | 3.2 | 39.1 | ○ |
| Comparative Example 8 | 23.1 | X | 0.9 | ○ | 4.4 | X | 4.5 | 2.3 | X |

| | Evaluation | | | | | | | |
|---|---|---|---|---|---|---|---|---|
| | Water solubility | | Long-term storability | | Packaging properties | | | |
| | Dissolution time | | Evaluation on | Orientation | Number of defective | | Chemical resistance | |
| | (sec.) | Evaluation | appearance | (nm) | sealing | Evaluation | Appearance | Evaluation |
| Example 1 | 28 | ○ | ○ | 1.0 | 0 | ○ | No change | ○ |
| Example 2 | 24 | ○ | ○ | 1.2 | 0 | ○ | No change | ○ |
| Example 3 | 18 | ⊙⊙ | ○ | 0.8 | 0 | ○ | No change | ○ |
| Example 4 | 19 | ⊙⊙ | ○ | 0.7 | 1 | ○ | No change | ○ |
| Example 5 | 23 | ○ | ○ | 1.0 | 0 | ○ | No change | ○ |
| Example 6 | 14 | ⊙⊙ | ○ | 1.0 | 0 | ○ | No change | ○ |
| Example 7 | 14 | ⊙⊙ | ○ | 9.7 | 0 | ○ | No change | ○ |
| Example 8 | 27 | ○ | ○ | 1.0 | 0 | ○ | No change | ○ |
| Comparative Example 1 | 20 | ○ | ○ | 5.0 | 0 | ○ | No change | ○ |
| Comparative Example 2 | 26 | ○ | ○ | 1.2 | 0 | ○ | No change | ○ |
| Comparative Example 3 | 25 | ○ | ○ | 1.2 | 0 | ○ | No change | ○ |
| Comparative Example 4 | 20 | ○ | ○ | 4.8 | 0 | ○ | No change | ○ |
| Comparative Example 5 | 26 | ○ | ○ | 1.3 | 1 | ○ | No change | ○ |
| Comparative Example 6 | 61 | X | ○ | 1.3 | 0 | ○ | No change | ○ |
| Comparative Example 7 | 60 | X | ○ | 1.2 | 0 | ○ | No change | ○ |
| Comparative Example 8 | 39 | X | ○ | 1.0 | 0 | ○ | No change | ○ |

INDUSTRIAL APPLICABILITY

The present invention can provide a water-soluble packaging film which is capable of inhibiting roll contamination, which has favorable unwinding properties to pass through processing steps smoothly, thereby improving the productivity, and which has enhanced water solubility, chemical resistance, visibility, and packaging properties.

The invention claimed is:

1. A water-soluble packaging film comprising:
   polyvinyl alcohol;
   a plasticizer; and
   starch,
   the starch being applied to a front surface and a rear surface of the water-soluble packaging film,
   the starch being applied in an amount of 0.001 to 0.10 g per 1 m² of the water-soluble packaging film,
   the water-soluble packaging film having a contact angle with distilled water measured by the sessile-drop method of 20° to 50°,
   the polyvinyl alcohol being modified with a hydrophilic group,
   the polyvinyl alcohol having a polymerization degree from 400 to 2000, and
   the hydrophilic group being at least one selected from the group consisting of a sulfonic acid group and a pyrrolidone ring group.

2. The water-soluble packaging film according to claim 1, wherein the polyvinyl alcohol has a saponification degree of 80 to 99.9 mol %.

3. The water-soluble packaging film according to claim 2, wherein the polyvinyl alcohol has a standard deviation (a) of saponification degree distribution of 0.1 to 1.0 mol %.

4. The water-soluble packaging film according to claim 3, wherein the polyvinyl alcohol in a 4% by weight aqueous solution has a viscosity measured at 20° C. of 5 to 35 mPa·s.

5. The water-soluble packaging film according to claim 4, wherein the water-soluble packaging film has an orientation of 0.5 to 9.9 nm.

6. The water-soluble packaging film according to claim 3, wherein the water-soluble packaging film has an orientation of 0.5 to 9.9 nm.

7. The water-soluble packaging film according to claim 2, wherein the polyvinyl alcohol in a 4% by weight aqueous solution has a viscosity measured at 20° C. of 5 to 35 mPa·s.

8. The water-soluble packaging film according to claim 7, wherein the water-soluble packaging film has an orientation of 0.5 to 9.9 nm.

9. The water-soluble packaging film according to claim 2, wherein the water-soluble packaging film has an orientation of 0.5 to 9.9 nm.

10. The water-soluble packaging film according to claim 1, wherein the polyvinyl alcohol has a standard deviation (a) of saponification degree distribution of 0.1 to 1.0 mol %.

11. The water-soluble packaging film according to claim 10, wherein the polyvinyl alcohol in a 4% by weight aqueous solution has a viscosity measured at 20° C. of 5 to 35 mPa·s.

12. The water-soluble packaging film according to claim 11, wherein the water-soluble packaging film has an orientation of 0.5 to 9.9 nm.

13. The water-soluble packaging film according to claim 10, wherein the water-soluble packaging film has an orientation of 0.5 to 9.9 nm.

14. The water-soluble packaging film according to claim 1, wherein the polyvinyl alcohol in a 4% by weight aqueous solution has a viscosity measured at 20° C. of 5 to 35 mPa·s.

15. The water-soluble packaging film according to claim 14, wherein the water-soluble packaging film has an orientation of 0.5 to 9.9 nm.

16. The water-soluble packaging film according to claim 1, wherein the water-soluble packaging film has an orientation of 0.5 to 9.9 nm.

\* \* \* \* \*